US007200098B2

(12) United States Patent
Yoo et al.

(10) Patent No.: US 7,200,098 B2
(45) Date of Patent: Apr. 3, 2007

(54) OBJECTIVE LENS FOR HIGH-DENSITY OPTICAL FOCUSING AND AN OPTICAL DISK IN AN OPTICAL PICKUP

(75) Inventors: Jang-hoon Yoo, Seoul (KR); Kun-ho Cho, Suwon (KR); Seung-tae Jung, Seongnam (KR); Chul-woo Lee, Seongnam (KR); Dong-ho Shin, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/091,449

(22) Filed: Mar. 29, 2005

(65) Prior Publication Data

US 2005/0169154 A1 Aug. 4, 2005

Related U.S. Application Data

(62) Division of application No. 09/725,879, filed on Nov. 30, 2000, now Pat. No. 6,938,890.

(30) Foreign Application Priority Data

Nov. 30, 1999 (KR) .................................. 99-53856

(51) Int. Cl.
*G11B 7/00* (2006.01)
(52) U.S. Cl. ................ 369/112.23; 369/44.23
(58) Field of Classification Search ...................... None
See application file for complete search history.

(56) References Cited

U.S. PATENT DOCUMENTS 4,433,340 A 2/1984 Mashita et al.

(Continued)

FOREIGN PATENT DOCUMENTS

CN 1186300 A 7/1998

(Continued)

OTHER PUBLICATIONS

Notice to Submit Response issued Apr. 27, 2006 by the Korean Intellectual Property Office re: Korean Patent Application No. 1999-53856 (7 pp).

*Primary Examiner*—Thang V. Tran
(74) *Attorney, Agent, or Firm*—Stein, McEwen & Bui, LLP

(57) ABSTRACT

An optical pickup includes a light source emitting a laser beam and an optical path changing unit altering a traveling path of an incident beam. An objective lens, disposed on an optical path between the optical path changing unit and an optical disk, focuses the incident beam from the light source to form a light spot on the optical disk of the objective lens. The optical pickup further includes a photodetector and an detecting-correcting unit, arranged on the optical path between the optical path changing unit and the objective lens, performing at least one of detecting the thickness of the optical disk and correcting aberration caused by thickness variations of the optical disk. The objective lens includes a first transmitting portion divergently transmitting an incident beam, where the first transmitting portion is at a relatively near-axis region from an optical axis of the objective lens. A second transmitting portion transmits the incident beam, where the second transmitting portion is arranged facing the first transmitting portion. A first reflecting portion condenses and reflects the incident beam from the first transmitting portion, where the first reflecting portion is formed around the second transmitting portion. A second reflecting portion condenses and reflects the incident beam from the first reflecting portion towards the second transmitting portion, where the second reflecting portion is formed around the first transmitting portion.

4 Claims, 6 Drawing Sheets

U.S. PATENT DOCUMENTS

| | | | |
|---|---|---|---|
| 4,940,890 A | 7/1990 | Opheij et al. | |
| 5,157,555 A * | 10/1992 | Reno | 369/44.11 |
| 5,321,550 A * | 6/1994 | Maruyama et al. | 369/112.24 |
| 5,416,757 A * | 5/1995 | Luecke et al. | 369/44.23 |
| 5,920,532 A | 7/1999 | Yagi et al. | |
| 6,159,572 A | 12/2000 | Kobayashi et al. | |
| 6,266,315 B1 | 7/2001 | Lee et al. | |
| 6,320,708 B1 | 11/2001 | Ueyanagi et al. | |
| 6,324,133 B1 | 11/2001 | Ichimura | |
| 6,339,577 B1 | 1/2002 | Hineno | |
| 6,353,582 B1 * | 3/2002 | Kikuchi | 369/44.23 |
| 6,377,535 B1 | 4/2002 | Chen et al. | |
| 6,418,108 B1 * | 7/2002 | Ueda et al. | 369/112.23 |
| 6,826,133 B2 * | 11/2004 | Ichimura et al. | 369/112.04 |
| 6,938,890 B2 | 9/2005 | Yoo et al. | |

FOREIGN PATENT DOCUMENTS

| | | |
|---|---|---|
| CN | 1229231 A | 9/1999 |
| JP | 2-216626 | 8/1990 |
| JP | 02-216626 | 8/1990 |
| JP | 06-214154 | 8/1994 |
| JP | 6-214154 | 8/1994 |
| JP | 9-138343 | 5/1997 |
| JP | 09-138343 | 5/1997 |
| JP | 09-197264 | 7/1997 |
| JP | 9-197264 | 7/1997 |
| JP | 9-325270 | 12/1997 |
| JP | 09-325270 | 12/1997 |
| JP | 00/08642 | 2/2000 |
| JP | 2000-163794 | 6/2000 |
| JP | 2000-171612 | 6/2000 |
| JP | 2000-206411 | 7/2000 |
| JP | 2001-133689 | 5/2001 |
| JP | 2001-154095 | 6/2001 |
| JP | 2001-154096 | 6/2001 |
| JP | 2001-189031 | 7/2001 |
| WO | WO 99/27532 | 6/1999 |

* cited by examiner

OBJECTIVE LENS FOR HIGH-DENSITY OPTICAL FOCUSING AND AN OPTICAL DISK IN AN OPTICAL PICKUP

This application is a divisional of U.S. patent application Ser. No. 09/725,879, filed Nov. 30, 2000, now U.S. Pat. No. 6,938,890, the disclosure of which is incorporated by reference.

BACKGROUND OF THE INVENTION

1. Field of the Invention

The present invention relates to an objective lens having a high numerical aperture (NA) for high-density optical focusing, an optical pickup adopting the objective lens, and a relatively thin optical disk suitable for the optical pickup.

2. Description of the Related Art

The information recording and reproduction density in an optical disk increases as the size of a light spot focused on the optical disk by an optical pickup decreases. In general, the size of the light spot focused on an optical disk is proportional to a wavelength ($\lambda$) of a light source over a numerical aperture (NA) of an objective lens. Thus, as shown in a functional relationship (1) below, the shorter the $\lambda$ of the light source and the larger the NA of the objective lens, the smaller the size of the light spot.

$$\text{size of light spot} \propto \lambda/\text{NA} \qquad (1)$$

For a higher recording and reproduction density, an optical pickup needs a light source capable of emitting a shorter wavelength of light and an objective lens having a high NA. However, due to the limitation in manufacturing a single objective lens, it is impossible to manufacture an objective lens having an NA of 0.8 or higher, making it difficult to satisfy the need for an allowable error below an optical aberration of $0.07\lambda_{ms}$. A conventional optical pickup for information recording and reproduction and objective lens is illustrated in FIGS. 1 and 2.

The conventional optical pickup illustrated is capable of recoding information with high density over an optical disk 1 having a 0.1-mm thick protective layer. The optical pickup includes a light source 11 having a wavelength, $\lambda$, of 400 nm, a grating 19 diffracting and transmitting an incident beam, a first polarization beam splitter (PBS) 21 altering the traveling path of the incident beam in a predetermined polarization direction, a $\lambda/4$ plate 23 guiding a circular polarized beam to the optical disk 1, and an objective lens unit 50 having an NA of 0.85. The optical pickup further includes a second PBS 27 transmitting or reflecting the incident beam from the optical disk 1 and, subsequently, from the first PBS 21. A main photodetector 31 receives the incident beam passed through the second PBS 27 and detects an information signal from the incident beam. A servo photodetector 37 receives the beam reflected from the second PBS 27 and detects an error signal therefrom.

The optical pickup further includes a collimating lens 13 collimating the incident beam, a beam shaping prism 15 shaping the incident beam, and a $\lambda/2$ plate 17 delaying the phase of the incident beam. The collimating lens 13, the beam shaping prism 15, and the $\lambda/2$ plate 17 are arranged on the optical path between the light source 11 and the grating 19. A second $\lambda/2$ plate 25 delaying the phase of the incident beam is further disposed on the optical path between the first PBS 21 and the second PBS 27. A first condensing lens 29 condenses the incident parallel beam and it is arranged between the second PBS 27 and the main photodetector 31. A second condensing lens 33 condenses the incident parallel beam and an astigmatism lens 35 creates astigmatism. The second condensing lens 13 and the astigmatism lens 13 are arranged between the second PBS 27 and the servo photodetector 37. A monitoring photodetector 41 monitors the optical power of the light source 11 from the beam reflected by the first PBS 21 and condensed by a third condensing lens 39. The objective lens unit 50 includes an objective lens 51 focusing the incident beam and a semi-spherical lens 55, which is arranged between the objective lens 51 and the optical disk 1, to increase the NA of the objective lens unit 50. In the above configuration of the objective lens unit 50, an NA of 0.6 can be secured by the objective lens 51 and increased by the semispherical lens 55.

Referring to FIG. 2, as long as the semispherical lens 55 does not cause an incident beam to refract, the NA of the semispherical lens 55 is proportional to the product of sin $\theta$ and a refractive index, n, of the semispherical lens 55, wherein $\theta$ is the maximum incident angle $\theta$ of light into the semispherical lens 55, which is expressed by equation (2). Thus, the NA of the objective lens unit 50 can be increased up to 0.85.

$$\text{NA}=n \sin \theta \qquad (2)$$

However, the conventional optical pickup includes two lenses to achieve such high NA. Thus, if a tilting occurs between the semispherical lens 55 and the objective lens 51, keeping a low optical aberration becomes difficult. When the semi-spherical lens 55 and the objective lens 51 are assembled into the objective lens unit 50, a restrictive control of distance and tilting error between the semispherical lens 50 and the objective lens 51 is needed, thereby making mass production of the objective lens unit 50 difficult.

In manufacturing the optical disk 1, an error in thickness is 3% or more. Accordingly, if the optical disk 1 has a thickness of 0.1-mm, the thickness error is ±3 µm or more. Such thickness error creates serious coma aberration and astigmatism when the objective lens unit 50 has an NA of 0.8 or more. Thus, a restrictive error management is desired in manufacturing a 0.1 mm thick optical disk so that the thickness error is within ±3 µm. However, it is difficult to produce a 0.1 mm thick optical disk with ±3 µm thickness error, or with a maximum thickness error of 5 µm, on a large scale.

In the conventional optical pickup described above, aberration caused by an error in thickness of the optical disk 1 is corrected by adjusting distance between the objective lens 51 and the semispherical lens 55. However, the configuration of an actuator for adjusting the distance between the objective lens 51 and the semispherical lens 55 is complicated.

SUMMARY OF THE INVENTION

Various objects and advantages of the invention will be set forth in part in the description which follows and, in part, will be obvious from the description, or may be learned by practice of the invention.

The present invention is achieved by providing an objective lens for high-density focusing. The objective lens is a single lens having a high numerical aperture (NA). The objective lens is included in an optical pickup that also includes a relatively thin optical disk.

According to an aspect of the present invention, an objective lens is provided including a first transmitting portion divergently transmitting an incident beam, where the first transmitting portion is at a relatively near-axis region from an optical axis of the objective lens, and a second transmitting portion transmitting the incident beam, where the second transmitting portion is arranged facing the first transmitting portion. A first reflecting portion, having a negative power, condenses and reflects the incident beam from the first transmitting portion, wherein the first reflecting portion is formed around the second transmitting portion. A second reflecting portion, having a positive power, condenses and reflects the incident beam from the first reflecting portion towards the second transmitting portion, wherein the second reflecting portion is formed around the first transmitting portion.

According to another aspect of the present invention an optical pickup includes a light source emitting a laser beam, an optical path changing unit altering a traveling path of an incident beam, an objective lens, disposed on an optical path between the optical path changing unit and an optical disk, focusing the incident beam from the light source to form a light spot on the optical disk, and a photodetector receiving the beam reflected from the optical disk and passed through the objective lens and the optical path changing unit. Further, a detection-correction unit, arranged on the optical path between the optical path changing unit and the objective lens, performs at least one of detecting the thickness of the optical disk and correcting aberration caused by thickness variations of the optical disk.

In another embodiment, an optical disk is provided including an information substrate having an incident surface receiving light to record and reproduce information, and a recording surface on which an information signal is recorded and from which at least a portion of an incident beam is reflected, wherein the thickness from the incident surface of the information substrate to the recording surface is less than 0.1-mm.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above and other objectives and advantages of the present invention will become more apparent by describing in detail preferred embodiments thereof with reference to the attached drawings in which.

DESCRIPTION OF THE PREFERRED EMBODIMENTS

Figure 1:
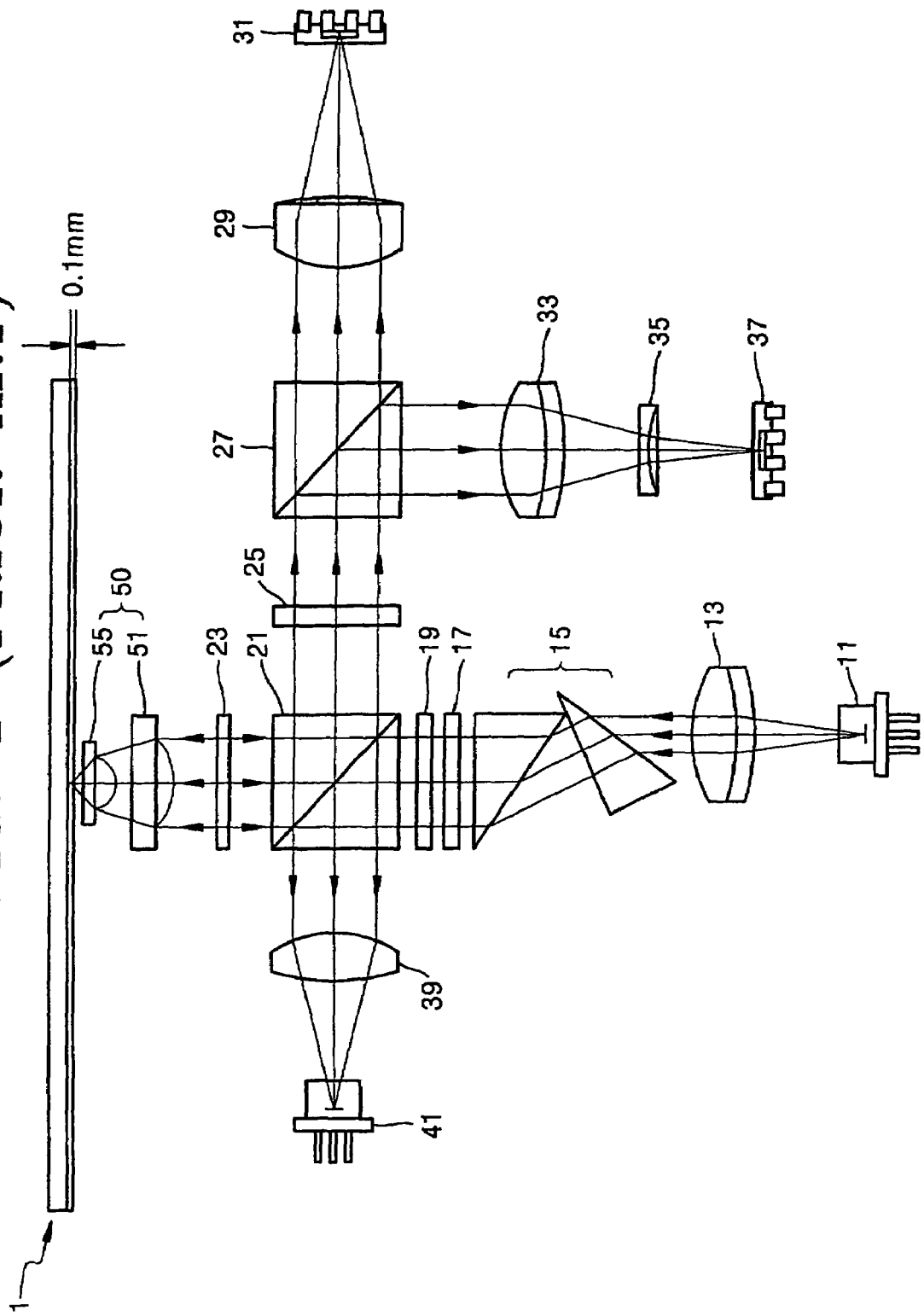
FIG. 1 is a diagram illustrating an optical arrangement of a conventional optical pickup including an objective lens unit for high-density focusing.
Figure 2:
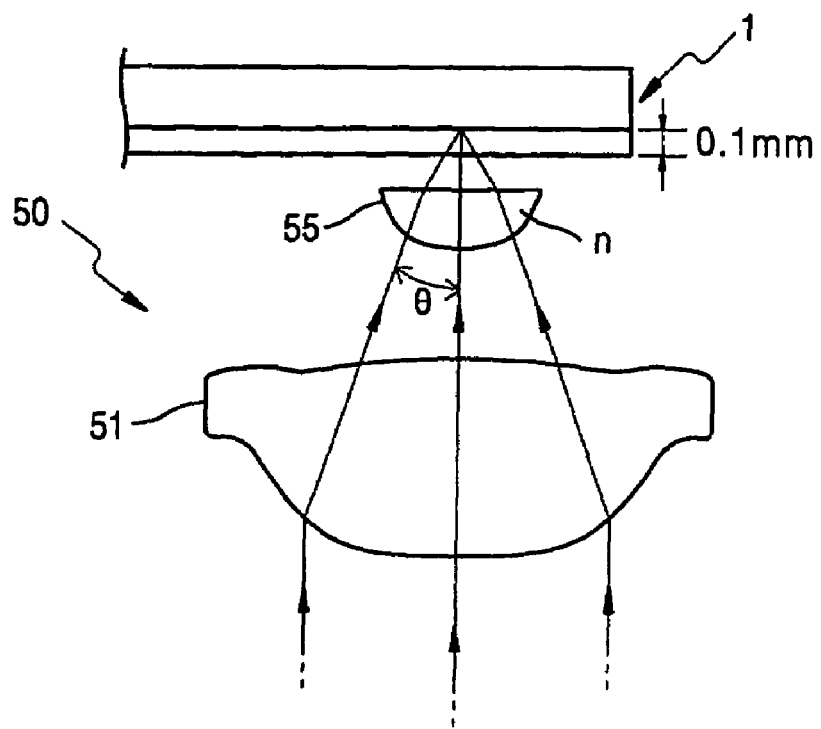
FIG. 2 is a diagram illustrating the objective lens unit in FIG. 1 having a high numerical aperture (NA)
Figure 3:
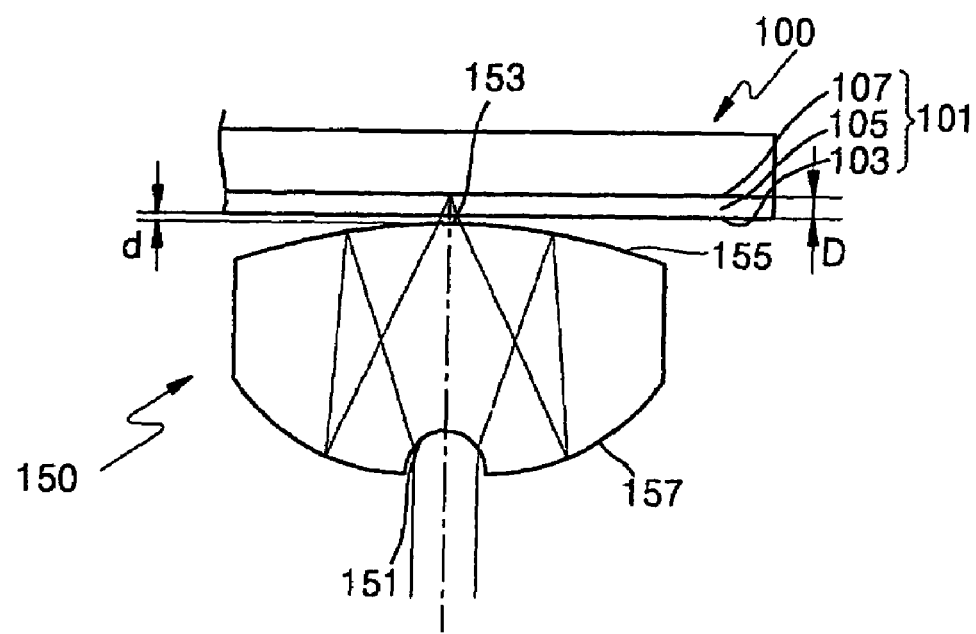
FIG. 3 is a diagram illustrating a configuration of an objective lens for high-density focusing for a parallel incident beam, in accordance with the present invention.

Referring to FIG. 3, an objective lens 150 for high-density focusing includes a first transmitting portion 151 located in a near axis region around the optical axis for divergently transmitting an incident beam. A second transmitting portion 153, facing the first transmitting portion 151, transmits the incident beam. A first reflecting portion 155, arranged around the second transmitting portion 153, condenses and reflects the incident beam which has passed through the first transmitting portion 151. A second reflecting portion 157, arranged around the first transmitting portion 151, condenses and reflects the incident beam reflected from the first reflecting portion 155 towards the second transmitting portion 153.

In an exemplary embodiment, the first transmitting portion 151 has a concave curvature with a negative power to remove optical field aberration. Specifically, the first transmitting portion 151 is designed with spherical and/or aspherical surfaces for minimum optical aberration according to the condition of the incident beam. The first reflecting portion 155 has a concave reflecting surface with a negative power, which maintains a high NA of 0.7 or more, and condenses and reflects the incident beam so that the size of the second transmitting portion 153 can be minimized. As a result, a light spot with ultra high resolution may be focused on an optical disk 100 for information recording and reproduction. The second reflecting portion 157 has a concave reflecting surface with a positive power for minimizing spherical and coma aberration and other staying optical aberration of the incident beam. In the alternative, the second reflecting portion 157 may be designed with an aspherical surface.

As shown in FIG. 3, the second transmitting portion 153 is designed to be planar. Alternatively, the second transmitting portion 153 may be designed with the same curvature as that of the concave reflecting surface of the first reflecting portion 155 allowing an easier manufacturing process. The space enclosed by the first transmitting portion 151, the second reflecting portion 157, the second transmitting portion 153, and the first reflecting portion 155 is filled with an optical material having a refractive index, n, different from that of air. Thus, the objective lens 150 may be obtained by processing a transparent optical material into the configuration described above. The objective lens 150 is used to focus a parallel incident beam on the optical disk 100.

The optical disk 100 may have a thickness D of 0.2 mm or less or of about 0.05 mm (50 μm), for instance, to overcome coma aberration and astigmatism which typically occur with objective lenses having a high NA. Furthermore, the optical disk 100 includes an information substrate 101 having an incident surface 103 for receiving light to record and reproduce information, a protective layer 105, and a recording surface 107 on which an information signal is recorded and from which at least a portion of the incident beam is reflected. The thickness D of the optical disk 100 corresponds to the thickness of the protective layer 105, i.e., from the incident surface 103 to the recording surface 107 of the information substrate 101.

Typically, the incident beam cannot be used to record information on or reproduce information from the optical disk 100 because the beam passing from the first transmitting portion 151 through the second transmitting portion 153 diverges, which inhibits focusing on a recording surface 107 of the optical disk 100. Also, the amount of light reflected from the recording surface 107 of the optical disk 100 is significantly reduced. Thus, the second transmitting portion 153 serves as a shield with respect to the light incident directly from the first transmitting portion 151, i.e., light of a near-axis beam. Only the beam incident from the first transmitting portion 151 toward the first reflecting portion 155, which is then reflected towards the second reflecting portion 157 and, subsequently, incident on the second transmitting portion 153, is used to record information on or reproduce information from the optical disk 100.

When the near-axis beam is shielded by the second transmitting portion 153, the size of the light spot focused on the recording surface 107 of the optical disk 100 is sharply reduced. Unnecessary side lobe components, as indicated by "s" in FIG. 4, to be later described, appear around the light spot corresponding to the size of the second transmitting portion 153. The side lobe components degrade the resolution of high-density light spot.

Further, if the first reflecting portion 155 is designed to have a concave curvature as the objective lens 150, the beam reflected by the first and second reflecting portions 155 and 157 and incident toward the second transmitting portion 153, may be focused in a small region. In this case, the second transmitting portion 153 may be formed to have a diameter much smaller than the outer diameter of the first reflecting portion 155 and smaller than the outer diameter of the beam incident on the first reflecting portion 155, thereby significantly reducing the side lobe components of the light spot. The objective lens 150, according to the present invention, may be manufactured as a single lens configuration with an NA of 0.8 or higher, which enables to form a high-density light spot with ultra high resolution.

In the present embodiment, when a ratio of the outer diameter of the second transmitting portion 153 to the outer diameter of the beam incident on the first reflecting portion 155 is 0.5 or less or, when the outer diameter of the second transmitting portion 153 and the outer diameter of the beam incident on the first reflecting portion 155 satisfy condition (3) below, the objective lens 150 can be effectively used to form a small light spot for reproducing information from the optical disk 100.

0.1 < diameter of second transmitting portion/outer diameter of light incident on first reflecting portion < 0.3     (3)

Furthermore, when an angle, α, between the optical axis and an outermost ray of the incident beam, which passes through the first transmitting portion 151 and reflects on the first and second reflecting portions 155 and 157 and thereafter passes through the second transmitting portion 153, is greater than or equal to 36° or satisfies a condition (4) below, the objective lens 150 effectively minimizes the size of the light spot focused on the optical disk 100.

$$36° \leq \alpha \leq 65°$$     (4)

An example of the optical data for the objective lens 150 having the above configuration according to the present invention is illustrated in Table 1. Table 1 shows the design data of the objective lens 150 suitable for a parallel incident beam when a working distance, d, between the emitting surface of the objective lens 150 and the receiving surface 103 of the optical disk 100 is 1.1 mm. The optical disk 100 is made of conventional material used in the optical field. Table 2 shows the aspherical coefficients of the aspherical surfaces listed in Table 1.

TABLE 1

| | Radius of curvature (mm) | Thickness or Distance (mm) | Medium |
|---|---|---|---|
| First transmitting portion | −0.59998 (aspherical surface 1) | 2.700000 | BACD5_HOYA |
| First reflecting portion | −14.44606 | −3.100000 | BACD5_HOYA |
| Second reflecting portion | 5.39477 (aspherical surface 2) | 3.100000 | BACD5_HOYA |
| Second transmitting portion | ∞ | 0.100000 | AIR |
| Optical Disk | ∞ | 0.100000 | — |

TABLE 2

| Aspherical coefficient | K | A | B | C | D |
|---|---|---|---|---|---|
| Aspherical surface 1 | −0.209233 | 0.137213E+00 | 0.3288285E+00 | −0.409641E+00 | 0.292448E+01 |
| Aspherical surface 2 | −0.164077 | −0.415232E−03 | −0.295529E−04 | 0.208258E−05 | −0.760111E−06 |

Figure 4:
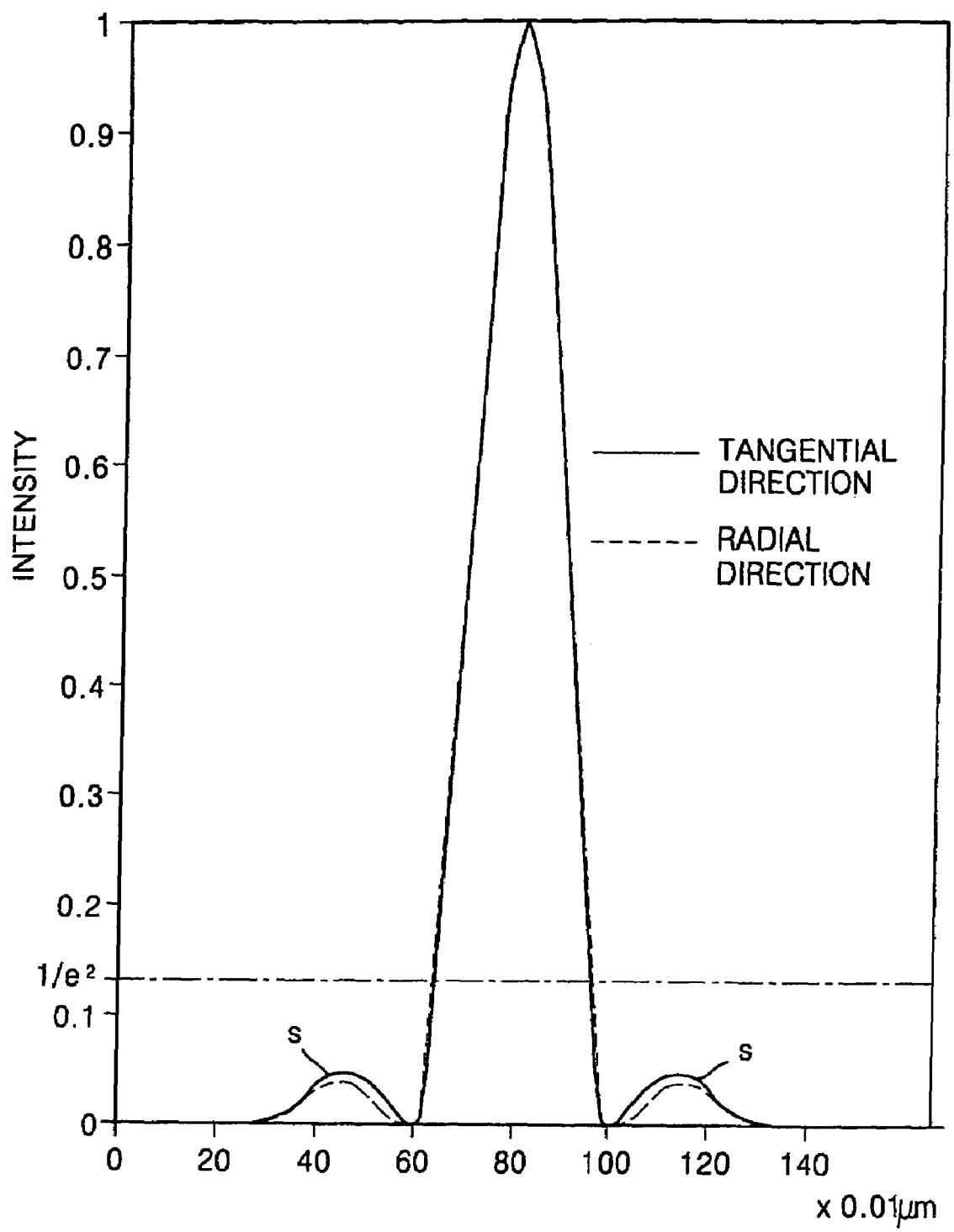
FIG. 4 is a diagram illustrating intensity distribution of a light spot focused by an objective lens for a parallel incident beam, in accordance with the present invention.

When a light spot is focused by the objective lens 150 designed with the above data, the intensity of the light spot distributes as illustrated in FIG. 4. The side lobe components indicated by "s" are maintained at 5% or less of the peak intensity of the light spot. At an intensity level of $1/e^2$, where e is energy, the size of the light spot is 0.35 μm in the tangential direction of the optical disk 100 and 0.37 μm in the radial direction of the optical disk 100. Thus, the light spot appears as a miniature light spot almost close to a circle.

Therefore, the objective lens 150 can achieve a high NA of 0.85 or more with a single lens configuration and thus, it may be applied to miniature optical systems that need a high NA. For instance, the objective lens 150 may be applied to microscopes equipped with a charge coupled device (CCD) camera that includes an objective lens and an ocular lens, optical exposure apparatuses for mask patterning in the manufacturing of semiconductor devices that include an objective lens, a light source and a collimating lens, and mastering apparatuses to manufacture optical disks. A person of ordinary skill in the art will appreciate that the optical design data for the objective lens 150 can be varied for a condensing or diverging incident beam.

Figure 5:
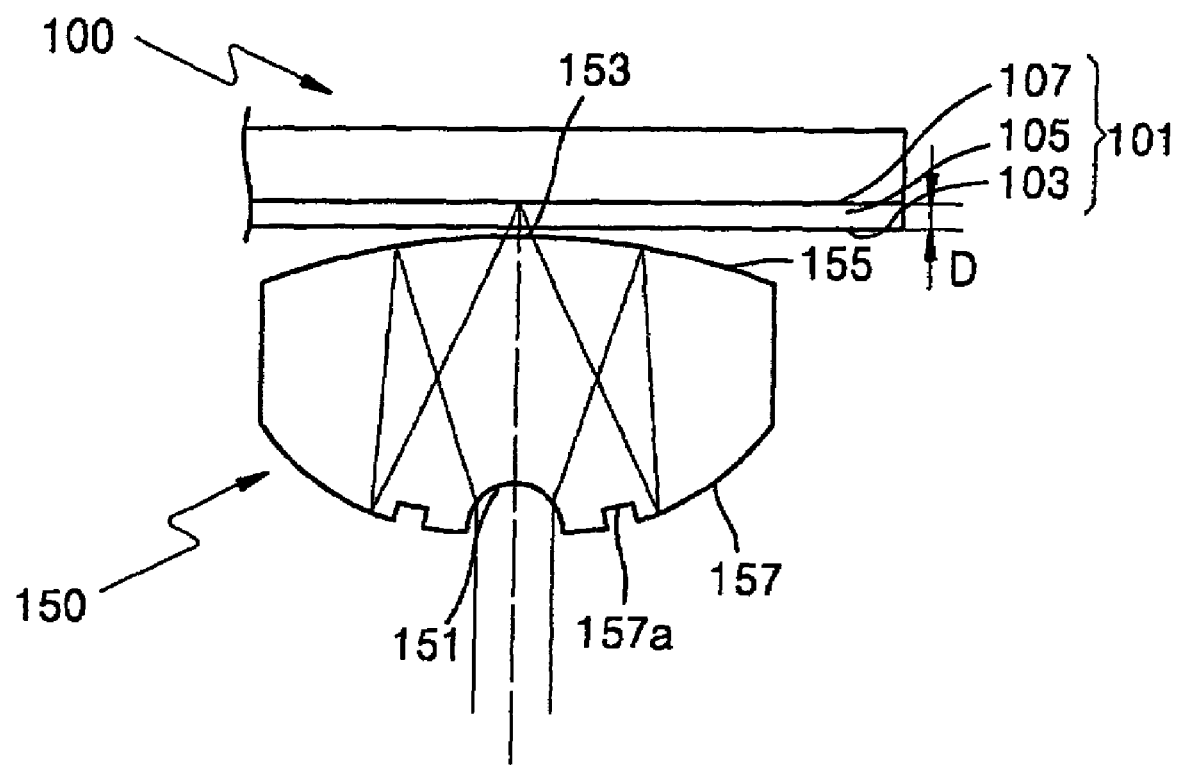
FIG. 5 is a diagram illustrating an alternative embodiment of the objective lens in FIG. 3.

FIG. 5 illustrates an alternative embodiment or configuration of the objective lens 150 in FIG. 3 in accordance with the present invention. The configuration of the objective lens 150 illustrated in FIG. 5 includes a path difference generating portion 157a that projects from or recesses into the concave curvature of the second reflecting portion 157. The path difference generating portion 157a generates a different path for at least a portion of the beam incident on the second reflecting portion 157 such that the side lobe components on the light spot are reduced.

In this configuration, a difference in optical paths occurs, i.e., a phase difference, between the beam incident on the path difference generating portion 157a from the first reflecting portion 155 and the beam incident on the other portion of the second reflecting portion 157. Interference caused by the different optical paths can further reduce the side lobe components of the light spot. Alternatively, the path difference generating portion 157a may be formed in the first reflecting portion 155.

The optical disk 100, in accordance to the present invention, may have a thickness D less than 0.1 mm less, such that coma aberration and astigmatism, which occur at the objective lens 150 having a high NA, may be overcome without the need to correct the spherical aberration as a result of thickness variations of the optical disk. For exemplary purposes, the optical disk 100 has a thickness D less than 50 μm. Further, the optical disk 100 can be manufactured within a thickness error range of ±5 μm with a maximum thickness error of 5 μm. Thus, correcting for spherical aberration due to thickness variations of the optical disk may be omitted. The optical disk 100 further includes the information substrate 101 described in FIG. 3.

Figure 6:
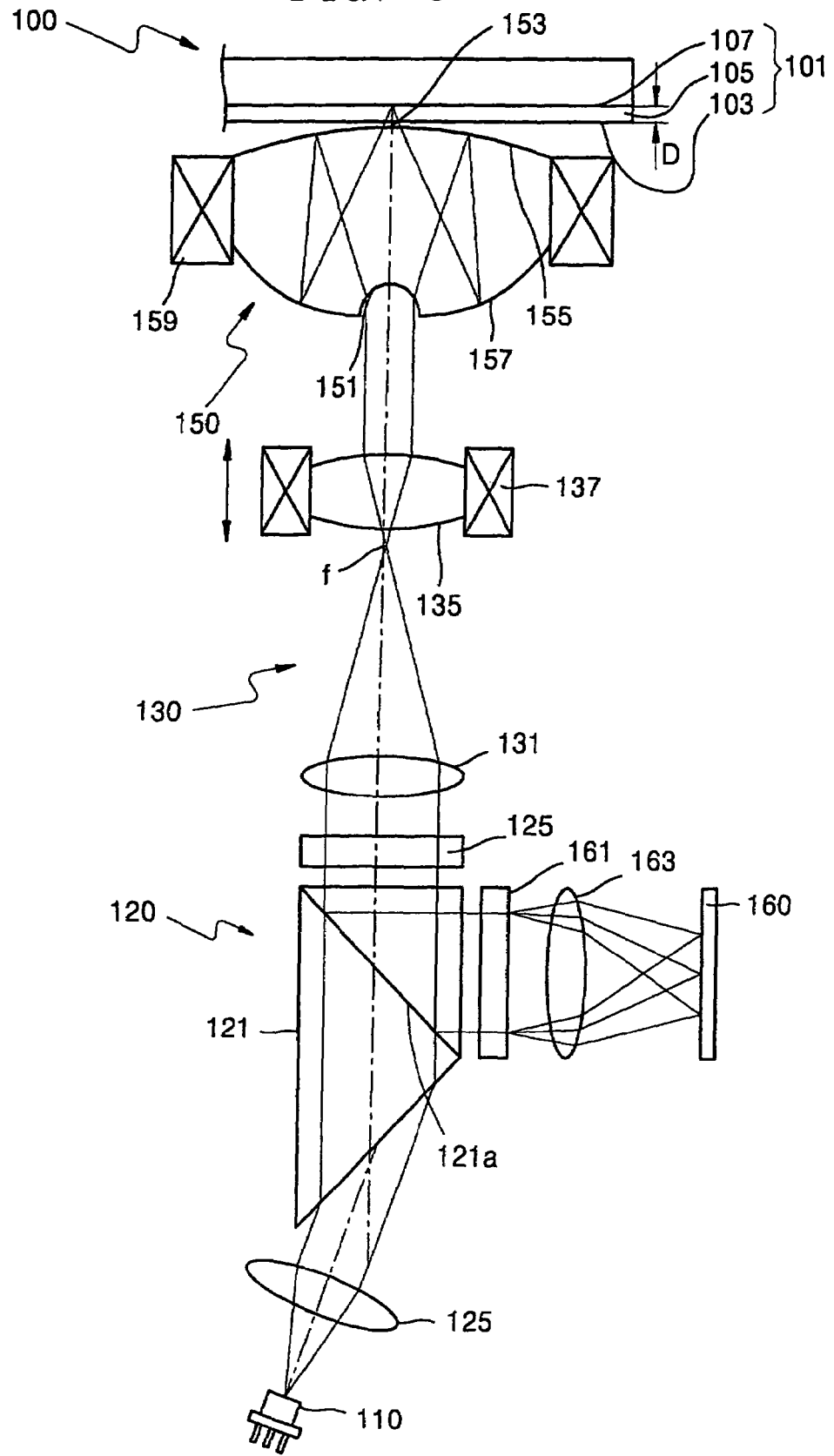
FIG. 6 is a diagram illustrating the optical arrangement of an optical pickup including an objective lens for high-density focusing, in accordance with the present invention.

FIG. 6 illustrates an optical arrangement of an optical pickup adopting the objective lens for high-density focusing in accordance with the present invention. The optical pickup includes a light source 110emitting a laser beam. In an exemplary embodiment, the light source 110 is a semiconductor laser, such as an edge emitting laser, emitting a blue laser beam having a wavelength of 500 nm or less. The laser beam emitted from the light source 110 is collimated by a collimating lens 125 and passed as an incident beam to an optical path changing unit 120. The optical path changing unit 120 alters the traveling path of the incident beam. The optical pickup further includes an objective lens 150 focusing the incident beam to form a light spot on an optical disk 100 and a photodetector 160. The photodetector 160 receives the beam reflected from the optical disk 100 and passed through the objective lens 150 and the optical path changing unit 120 to detect information and error signals. In the present embodiment, the optical disk 100 has a protective layer having a thickness of 0.2 mm or less, for instance 0.05 mm, for a recording density of, for instance, about 20 gigabytes or more.

The optical path changing mean 120 includes a polarization beam splitter (PBS) 121 having a mirror surface 121a to transmit and reflect the incident beam according to the polarization of the incident beam, and a wave plate 125 to change the polarization of the incident beam. The PBS 121 serves to shape the incident beam from the light source 110. When a vertical cavity surface emitting layer (VCSEL) for emitting light in the stack of semiconductor material layers is adopted as the light source 110, a cubic type PBS is employed in the optical pickup.

The PBS 121 arranged on the optical path between the light source 110 and the objective lens 150 transmits one polarization component of the incident beam and reflects the other polarization component of the incident beam. In an exemplary embodiment, the wave plate 125, arranged on the optical path between the PBS 121 and the objective lens 150, is a quarter-wave plate phase shifting by λ/4 the beam emitted from the light source 110. When light travels back through the objective lens 150 after been reflected from the optical disk 100, the wave plate 125 changes the polarization of the incident beam such that the beam reflected from the optical disk 100 is reflected by the mirror surface 121a of the PBS 121 and goes towards the photodetector 160.

The objective lens 150 is driven in the focusing and tracking direction of the optical disk 100 by an actuator 159. As previously mentioned, the objective lens 150 includes a first transmitting portion 151 divergently transmitting the incident beam and a second transmitting portion 153 arranged facing the first transmitting portion 151. A first reflecting portion 155 arranged around the second transmitting portion 153, condenses and reflects the beam incident through the first transmitting portion 151. A second reflecting portion 157 is arranged around the first transmitting portion 151 to condense and reflect the incident beam reflected from the first reflecting portion 155 around the second transmitting portion 153. In the present embodiment, the first and second transmitting portions 151 and 153 and the first and second reflecting portions 155 and 157 have approximately the same configurations and functions as those illustrated previously, and thus a description thereof will not be repeated.

The photodetector 160 receives the incident beam reflected from the optical disk 100 and directed toward the photodetector 160 by the PBS 121 and is divided into a plurality of portions for separate photoelectric conversion. In an exemplary embodiment, a hologram optical element (HOE) 161 diffracts and transmits the incident beam thereby splitting the incident beam into an error signal detection beam and an information detection beam. A condensing lens 163 condenses the beam passed through the HOE 161. The HOE 161 and the condensing lens 163 are disposed on the optical path between the PBS 121 and the photodetector 160.

In considering the difficulty in keeping the thickness error of the protective layer 105 below ±3 μm during manufacturing of the optical disk 100, the optical pickup further includes a correcting unit 130 on the optical path between the optical path changing unit and the objective lens 150. The correcting unit 130 detects and corrects spherical aberration caused by thickness variations of the protective layer 105 and/or by optical disks having different thicknesses. For example, as illustrated in FIG. 6, the correcting unit 130 includes a relay lens 131 condensing the incident beam from the light source 110, a correcting lens 135 arranged on the optical path between the relay lens 131 and the objective lens 150, and an actuator 137 actuating the correcting lens 135 along the optical axis. Aberration caused by thickness variations of the optical disk 100 is detected and/or corrected by actuating the correcting lens 135 along the optical axis with the actuator 137.

In an exemplary embodiment, the actuator 137 is installed separately from the actuator 159 actuating the objective lens 150 along the focusing and tracking direction to reduce a load applied to the actuator 159 from the objective lens 150. Alternatively, the actuator 137 may be attached to the relay lens 131.

The relay lens 131 arranged on the optical path between the optical path changing unit 120 and the objective lens 150, condenses the parallel incident beam from the light source 110 to focus a focal point f in front of the objective lens 150. The correcting lens 135 arranged between the focal point f and the objective lens 150 condenses the incident beam diverging after having been focused as the focal point f by the relay lens 131 such that the parallel incident beam go toward the objective lens 150.

When moving the correcting lens 135 along the optical axis, the size of the beam incident on the first transmitting portion 151 of the objective lens 150 varies. In particular, when the actuator 137 drives the correcting lens 135 along the optical axis toward the optical disk 100, the size of the incident beam of the objective lens 150 increases. If the actuator 137 drives the correcting lens 135 along the optical axis away from the optical disk 100, the size of the incident beam of the objective lens 150 decreases. The focal position of the light spot can be varied by adjusting the size of the incident beam of the objective lens 150 so that spherical aberration caused by thickness variations of the optical disk and/or by adopting another optical disk having a different thickness can be corrected.

The correcting unit 130 can be applied to detect aberration due to thickness variations of the optical disk 100. In particular, while actuating the correcting lens 135 along the optical axis, the light spot is focused on the recording surface 107 and the incident surface 103 of the optical disk 100 in succession. The incident beam reflected from each of the recording and incident surfaces 107 and 103 is received by the photodetector 160 and focus error signals from the recording and incident surfaces 107 and 103 are detected. If the thickness of the protective layer 105 of the optical disk 100 is beyond a predetermined thickness, the incident beam focused on the recording surface 107 includes defocus aberration, whereas the incident beam focused on the incident surface 103 includes no aberration. As a result, the two defocus error signals have a relative offset and the thickness deviation of the optical disk 100 can be detected from the degree of offset. A time lapse between the two focus error signals is calculated using a circuit (not shown) and the thickness of the optical disk 100 can be calculated by multiplying the time lapse by a scanning speed of the correcting lens 135. Thus, the thickness deviation of the adopted optical disk 100 may be detected.

Alternatively, in order to detect thickness deviations of the optical disk 100, a hologram optical element (HOE) (not shown) may be disposed between the light source 110 and the optical path changing unit 120. The HOE diffracts and/or transmits a near-axis beam and a far-axis beam to be focused on the recording surface 107 and the incident surface 103, respectively. Subsequently, while the correcting lens 135 or the objective lens 150 is slightly actuated along the optical axis, the photodetector 106 receives the near-axis beam and the far-axis beam reflected from the recording surface 107 and the incident surface 103. A time lapse between two focus error signals is then detected from the near-axis beam and the far-axis beam. The thickness deviation of the optical disk 100 can be detected based on the time lapse. This technique detects the thickness deviation of the optical disk 100 and it may be applied to detect comma aberration caused by tilting of the optical disk 100.

The optical pickup adopting the correcting unit 130 as described above detects and/or corrects aberration caused by thickness deviations of the optical disk 100 by actuating the correcting lens 135 along the optical axis. Thus, a light spot can be focused on the recording surface 107, irrespective of the thickness error of the optical disk 100, so that high quality record and reproduction signals can be obtained.

Figure 7:
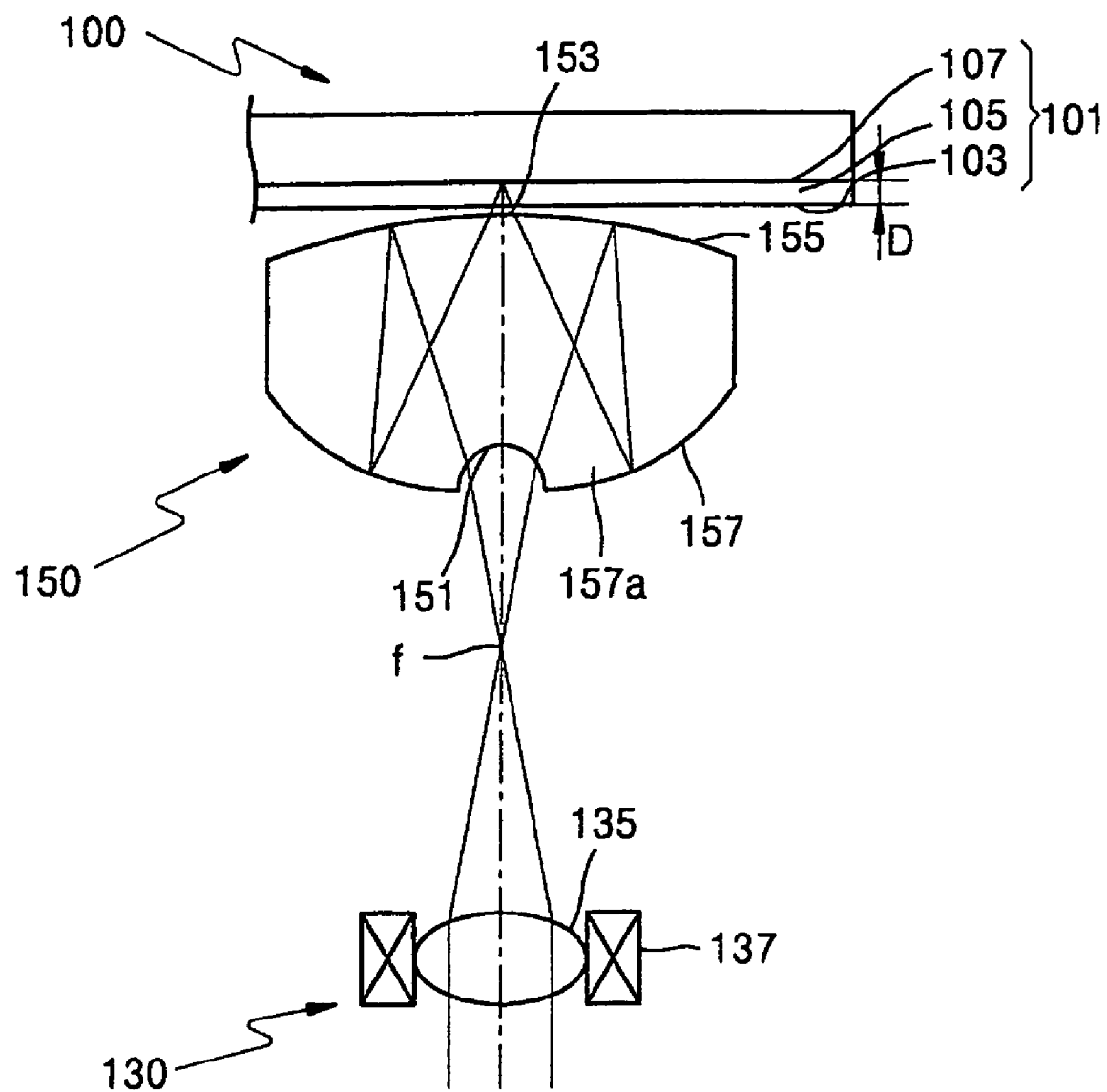
FIG. 7 illustrates an alternative embodiment of the optical pickup, in accordance with the present invention.

FIG. 7 illustrates an alternative embodiment of the optical pickup. A single correcting lens 135 is implemented as the correcting unit 130. In this embodiment, the objective lens 150 is designed to be suitable for a diverging incident beam. A parallel incident beam is condensed by the correcting lens 135 to focus a focal point f in front of the objective lens 150 and then, the focused spot diverges towards the objective lens 150. The size of the incident beam of the first transmitting portion 157 of the objective lens 150 can be varied by actuating the correcting lens 135 along the optical axis, such that the aberration caused by thickness variations of the optical disk 100 and/or by adopting another optical disk having a different thickness can be detected and/or corrected. See FIG. 6

The objective lens having the above configuration according to the present invention has the effect of shielding the near-axis beam and thus, a high NA of 0.8 or more can be achieved in a single lens configuration. The objective lens is able to sharply reduce the side lobe components of a light spot so that a high-density light spot with ultra high resolution may be focused on the optical disk. Therefore, when the objective lens is applied to optical pickups, microscopes, optical exposure apparatuses for manufacturing semiconductor devices, and mastering apparatuses for manufacturing optical disks, the optical systems of these apparatuses may be reduced.

The optical pickup adopts the single objective lens so that the configuration of the actuator is simple and optical aberration is kept at a low level. Further, an ordinary person skilled in the art will appreciate that the optical pickup provides for easy assembly and manufacturing. The protective layer of the optical disk according to the present invention is thinner than 0.1-mm so that a thickness error in manufacturing may be reduced to ±5 μm or less. Thus, the present invention makes it unnecessary to correct for spherical aberration due to thickness deviations of the optical disk.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An optical pickup, comprising:
a light source emitting an incident beam;
an optical path changing unit altering an optical path of the incident beam;
an objective lens, including a first transmitting portion at a near-axis region of an optical axis of the objective lens to divergently transmit the incident beam, a second transmitting portion facing the first transmitting portion to transmit the incident beam, a first reflecting portion formed around the second transmitting portion to condense and reflect the incident beam from the first transmitting portion, and a second reflecting portion formed around the first transmitting portion to condense and reflect the incident beam from the first reflecting portion towards the second transmitting portion, so as to focus the incident beam from the light source and to form a light spot on an optical disk;
a photodetector receiving the beam reflected from the optical disk and passed through the objective lens and the optical path changing unit; and
a detecting-correcting unit, including a relay lens to condense the incident beam and a correcting lens both of which are arranged on the optical path between the optical path changing unit and the objective lens, the detecting-correcting unit actuating the correcting lens toward and from the relay lens upon a detection of a thickness of the optical disk so as to correct an aberration caused by thickness variations of the optical disk.

2. The optical pickup of claim 1, wherein the objective lens is disposed on the optical path between the optical path changing unit and the optical disk.

3. The optical pickup of claim 2, wherein the relay lens of the detecting correcting unit is closer to the light source than the correcting lens.

4. A pickup, including a light source to emit an incident beam and an optical path changing unit to alter a path of the incident beam, the pickup comprising:
an objective lens, including a first transmitting portion at a near-axis region of an optical axis of the objective lens to divergently transmit the incident beam, a second transmitting portion facing the first transmitting portion to transmit the incident beam, a first reflecting portion formed around the second transmitting portion to condense and reflect the incident beam from the first transmitting portion, and a second reflecting portion formed around the first transmitting portion to condense and reflect the incident beam from the first reflecting portion towards the second transmitting portion, so as to focus the incident beam from the light source and to form a light spot on an optical disk;

a photodetector to receive the beam reflected from the optical disk and passed through the objective lens and the optical path changing unit; and a detecting-correcting unit, arranged on the optical path between the optical path changing unit and the objective lens, to correct an aberration of the incident beam caused by thickness variations of the optical disk upon a detection of a thickness of the optical disk.

* * * * *